(12) United States Patent
Anderson et al.

(10) Patent No.: US 8,322,800 B2
(45) Date of Patent: Dec. 4, 2012

(54) CONTROL SYSTEM FOR HYDRAULIC BRAKING SYSTEM

(75) Inventors: Chris Anderson, Paris (FR); Raynald Sprocq, Esbly (FR); Carole Charpentier, Montmorency (FR)

(73) Assignee: Robert Bosch GmbH, Stuttgart (DE)

( * ) Notice: Subject to any disclaimer, the term of this patent is extended or adjusted under 35 U.S.C. 154(b) by 418 days.

(21) Appl. No.: 12/667,584

(22) PCT Filed: Jun. 4, 2008

(86) PCT No.: PCT/EP2008/056883
§ 371 (c)(1),
(2), (4) Date: Jan. 4, 2010

(87) PCT Pub. No.: WO2009/003781
PCT Pub. Date: Jan. 8, 2009

(65) Prior Publication Data
US 2010/0181152 A1 Jul. 22, 2010

(30) Foreign Application Priority Data
Jul. 2, 2007 (FR) ...................................... 07 04813

(51) Int. Cl.
*B60T 8/44* (2006.01)
(52) U.S. Cl. ..................................... 303/114.3; 188/357
(58) Field of Classification Search ............... 303/114.3, 303/115.3; 188/355, 356, 357
See application file for complete search history.

(56) References Cited

U.S. PATENT DOCUMENTS

| | | | | | |
|---|---|---|---|---|---|
| 2,373,272 | A | * | 4/1945 | Stelzer | 188/357 |
| 2,381,989 | A | * | 8/1945 | Stelzer | 188/357 |
| 2,393,524 | A | * | 1/1946 | Fant, Jr. | 188/357 |
| 2,933,160 | A | * | 4/1960 | Van Wart et al. | 188/357 |
| 5,350,225 | A | | 9/1994 | Steiner et al. | |

FOREIGN PATENT DOCUMENTS

| DE | 19750977 A1 | 6/1999 |
|---|---|---|
| WO | 2007/042413 A1 | 4/2007 |

OTHER PUBLICATIONS

FR0704813 Search Report and Written Opinion.

\* cited by examiner

*Primary Examiner* — Thomas J Williams
(74) *Attorney, Agent, or Firm* — Michael Best & Friedrich LLP

(57) ABSTRACT

The invention relates to a braking control system for automotive vehicles comprising a braking control member (1), a brake booster (4) and a brake master cylinder (5). The system of the invention further comprises a simulator (3) coupled pneumatically to the piston (42) of the brake booster (4). Said simulator (3) receives at least one braking command from the braking control member (1) and makes it possible to establish, in return, a difference in pressure between the front chamber (40) and the rear chamber (41) of the brake booster so as to control the displacement of the piston (42).
Application: Brakes for automotive vehicles.

20 Claims, 8 Drawing Sheets

CONTROL SYSTEM FOR HYDRAULIC BRAKING SYSTEM

BACKGROUND OF THE INVENTION

The invention relates to a braking control system for automotive vehicles and, in particular, a hydraulic control system. The invention also relates to mixed braking systems as provided in hybrid vehicles (vehicles having an electric drive and an internal combustion engine drive) comprising a hydraulically actuated braking system and an electric braking system using the electric traction motor(s) as electric generators.

In the known prior art of hydraulic braking systems of automotive vehicles, a brake booster essentially has a housing comprising two chambers (the front chamber or vacuum chamber and the rear chamber or working chamber) separated by a mobile diaphragm fixed to a piston. A control rod may be displaced to the front of the vehicle when the driver of the vehicle actuates the brake pedal. This displacement of the control rod is transmitted to a plunger which actuates assistance means and the piston of the servomotor. Generally, said assistance means comprise a three-way valve, the actuation thereof making it possible to interrupt the communication between the vacuum chamber and the working chamber of the servomotor and to open said latter chamber to the ambient atmosphere. Given that the vacuum chamber is normally under a vacuum and due to the difference in pressure between the two chambers, a boost force is exerted on the piston which separates the two chambers. The piston is, therefore, displaced to the front, acting on a push rod used to actuate the master cylinder of the braking circuit.

The control rod which is actuated by the braking control member (brake pedal) is in contact with the piston of the servomotor, which is in contact with the push rod which acts on the piston of the master cylinder. The different elements which couple the brake pedal to the piston of the master cylinder are thus in contact with one another. The driver thus senses the reactions of the braking circuit via the brake pedal.

However, if a device of the vehicle displaces brake fluid from any point of the braking circuit to the master cylinder, a reaction will be produced in the region of the brake pedal and this reaction will be felt by the driver. For example, during a braking procedure which has the effect of locking the wheels of the vehicle, the anti-lock braking system (ABS) has the function of reducing the braking and thus removing brake fluid from the wheel brakes to inject it into the master cylinder. Alternatively, in electronic stability programs (ESP), a hydraulic unit is capable of acting on one or more braking circuits independently of the control of the brakes and this action is also felt in the region of the brake pedal and if the driver brakes during this operation of the ESP, he/she will feel a variation in the braking sensation which does not necessarily correspond to the braking sensation which the driver normally feels.

It is also appropriate to mention that the injection of brake fluid into the braking circuit via the hydraulic unit may cause the backward movement of the pistons of the master cylinder and this also has the effect of causing a backward movement of the brake pedal. If this occurs when the driver exerts a relatively high braking force, the backward movement of the brake pedal is absorbed by the ankle of the driver which at the very least may be unpleasant for the driver. This may even be the cause of physical injury during an accident, in particular a front impact, occurring when the driver exerts a high pressure on the brake pedal.

It may, therefore, be useful to dampen, or even to suppress or to absorb the retransmission of all these forces which are produced in the braking circuits and/or in the master cylinder in the direction of the brake pedal.

One solution to resolve these drawbacks is to provide an electric control of the control system and to provide a system which applies mechanical commands to the brake pedal which simulate braking sensations which the driver usually feels with a conventional braking system in the same braking conditions. In the remainder of the description, said device is referred to as the "brake-feel simulator". In such a system, the real braking devices are thus disconnected from the brake-feel simulator which, when braking is reapplied, applies forces to the brake pedal.

However, such systems are costly relative to conventional hydraulic braking systems. The introduction of electric controls and connections generally poses problems of reliability. These systems are thus all the more costly if the same demands of reliability and safety are imposed thereon as in conventional hydraulic systems.

Moreover, so-called hybrid vehicles which have both at least one electric traction motor powered by batteries for the propulsion of the vehicle and an internal combustion engine (using petrol, diesel, gas or any other fuel) are generally provided with electric brakes in which the braking is obtained by regenerative braking and energy recovery from the electric traction motor of the vehicle. The electric traction motor thus functions as an electric generator, the recovered electrical energy being used to recharge the batteries which is advantageous for the use of the vehicle.

In these systems it is also possible to vary the electric braking torque. During braking, the electric brake is not always applied to a maximum. This may be the case, for example, with the use of radar providing information about road conditions or during a more or less rapid maneuver of the brake pedal (for example, hard pressure followed by a release of the brake pedal).

It may also be provided to transmit an inverse current to the electric motor, either for safety reasons or for reasons of the feel of the brake pedal.

However, electric braking is not entirely satisfactory due, in particular, to the gradual increase in its efficiency and the reduction in efficiency at low speeds. It is appropriate, therefore, to provide the vehicle with a braking system which is able to remedy the drawbacks of the electric braking system.

Hydraulic control systems using brake boosters have proved advantageous and it is known to provide a hydraulic braking system which might provide complementary braking to the electric braking system. The hydraulic braking system is thus not directly coupled to the brake pedal but is controlled via an intermediate control device.

SUMMARY OF THE INVENTION

The invention relates, therefore, to a braking control system which makes it possible to remedy these problems and advantageously a braking system, of which the actuation of the braking devices of the wheels of the vehicle is hydraulic. This system makes it possible to isolate the brake pedal from the effects produced on braking circuits of the vehicle by the various systems of the vehicle, such as the anti-lock braking system (ABS), or the electronic stability program (ESP), but which restores to the brake pedal the effects which simulate braking sensations. It may also be used in a vehicle provided with an electric braking system to complement the operation of this electric system.

The invention relates, therefore, to a braking control system for automotive vehicles comprising:
a braking control member, a brake booster which comprises a vacuum chamber and a working chamber separated by a servomotor piston, said brake booster making it possible to provide increased braking control according to the difference in pressure existing between said two chambers, a brake master cylinder receiving the increased braking commands from the brake booster and producing a braking pressure in the hydraulic braking circuit of the vehicle, the system further comprising a simulator coupled pneumatically or hydraulically to the piston of the brake booster, said simulator receiving at least one braking command from the braking control member and making it possible to establish or monitor, in return, a difference in pressure between the vacuum chamber and the working chamber of the brake booster, so as to control the displacement of the piston.

According to the invention, said simulator comprises a hydraulically controlled pneumatic three-way valve, making it possible:

in the event of a braking command initiated by the braking control member, to put the working chamber in communication with a greater pressure than that of the vacuum chamber to control the operation of the brake booster and, as a result, the actuation of the master cylinder, when the pressure in the hydraulic braking circuit of the vehicle exceeds a certain pressure threshold: to stop the communication of the working chamber with said pressure which is greater than that of the vacuum chamber.

According to an embodiment of the invention, the three-way valve comprises:

an axially mobile probe, an axially mobile check valve, capable of bearing against said mobile probe, an axially mobile check valve seat capable of bearing against the check valve.

The mobile probe is controlled by the braking control member so as to move away from the check valve and thus put the working chamber in communication with atmospheric pressure, and said check valve seat being controlled by the pressure prevailing in the hydraulic braking circuit to move away from said check valve and permit said check valve to move toward the mobile probe and to interrupt the communication of the working chamber with atmospheric pressure when the pressure in the braking circuit exceeds said pressure threshold.

According to an advantageous embodiment of the invention, said check valve seat is carried by an axially mobile bushing or forms part of said bushing. A first spring makes it possible to exert a first force on said bushing to push it toward the check valve. The bushing is mobile in a first pressure admission chamber which is hydraulically coupled to the hydraulic braking circuit of the vehicle and which is brought to the pressure which prevails in the hydraulic braking circuit, so that said pressure exerts on the bushing a second force counter to the first force exerted by the first spring.

Advantageously, the system comprises at least one second spring providing a third force, tending to oppose the axial displacement of said probe under the control of the braking control member.

According to a variant, the system comprises a third spring (R22) having an elasticity which is different from that of the second spring (R21) and which provides a fourth force which tends, in combination with the force of the second spring, to oppose the axial displacement of said probe (32) under the control of the braking control member.

According to one embodiment, the axially mobile check valve comprises a control shaft having a bearing element on which said second and third springs exert their forces, which tend to oppose the axial displacement of said probe.

Advantageously, said simulator comprises a control piston, hydraulically controlled by the braking control member and which makes it possible to control the displacement of said probe.

According to an advantageous embodiment of the invention, the system comprises an actuating device comprising an actuating chamber in which an actuating piston, controlled by the control member, slides, said control piston being coupled hydraulically to said actuating chamber by a stop valve so that:

in a first operating mode said stop valve permits the actuating piston to control the displacement of the control piston, and that in a second operating mode, said stop valve prevents the actuating piston from controlling the displacement of the control piston, the actuating piston thus hydraulically controlling the displacement of a control rod which acts on a primary piston of the master cylinder.

According to the invention, it may also be provided that said control rod acts on the servomotor piston, which acts on the primary piston of the master cylinder.

According to a variant of the system according to the invention, the brake master cylinder comprises a primary piston which comprises an annular piston which is controlled by the brake servo piston and a central piston which slides in the annular piston and which is controlled by the control member without the intervention of the brake servo piston.

According to this variant, it may also be provided that a control rod actuated hydraulically by the actuating piston makes it possible to act on the servomotor piston.

Advantageously, the control rod is mechanically coupled to said central piston. It may thus comprise a shoulder which is not intended to be in contact with the servomotor piston of a pneumatically assisted braking system, when the three-way valve of the simulator is in a state of braking equilibrium and which is intended to press against the servomotor piston during non-assisted braking, or in contrast, beyond braking saturation of the pneumatic brake booster during assisted braking.

BRIEF DESCRIPTION OF THE DRAWINGS

The different subjects and features of the invention will become apparent more clearly in the description which follows and given by way of example, in combination with the accompanying figures, in which.

DETAILED DESCRIPTION

Figure 1:
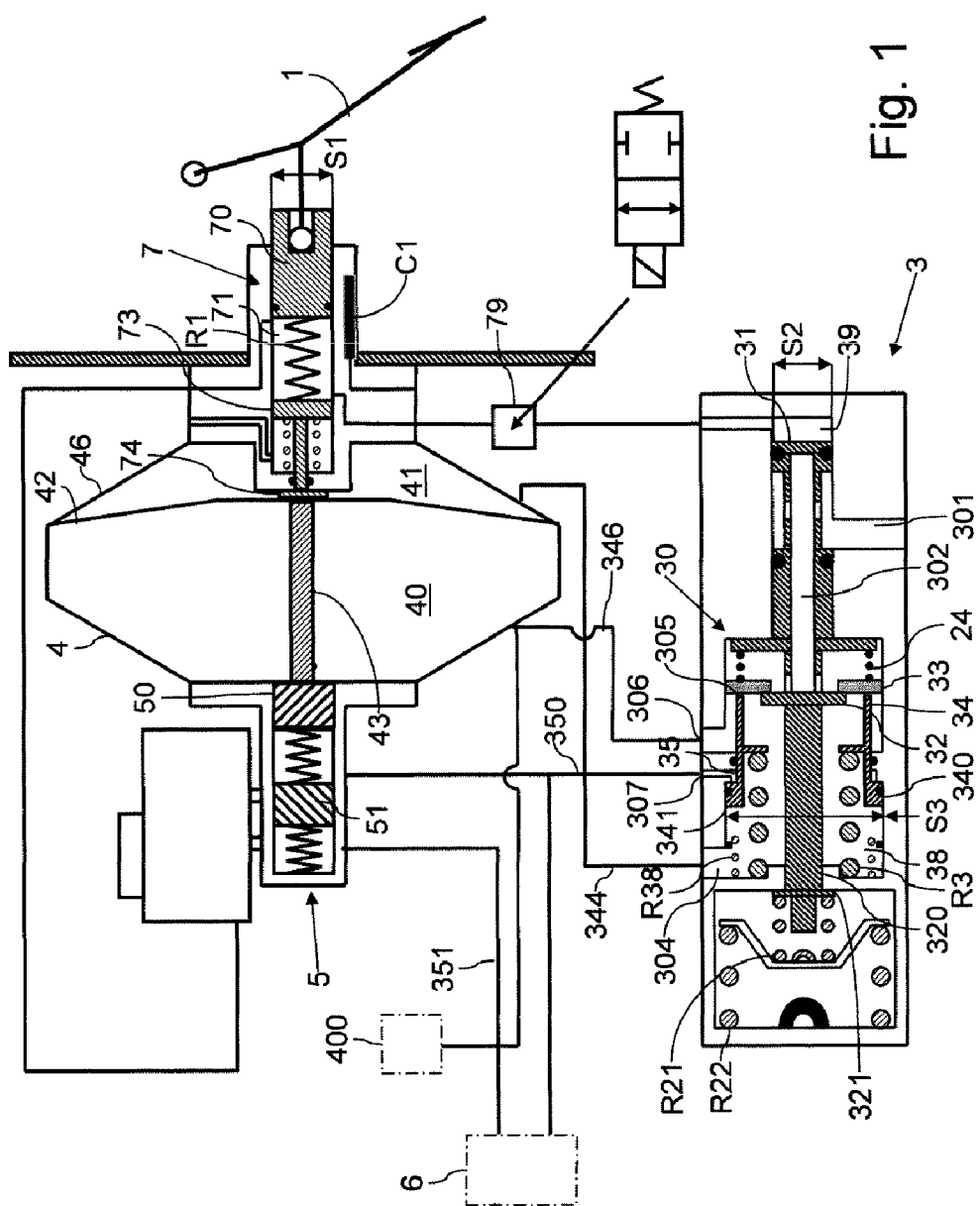
FIG. 1 shows an embodiment of the braking circuit control system according to the invention.

Referring to FIG. 1, an embodiment of the braking circuit control system according to the invention will now be described.

Said system comprises in the known manner a brake booster 4 which will be denoted "brake servo" in the description which follows and which comprises a working chamber 41 and a vacuum chamber 40 separated by a diaphragm or brake servo piston 42 able to be displaced along the axis of the brake servo 4. The displacement of the piston 42 controls, by means of a push rod 43, the displacement of the pistons 50, 51 of a brake master cylinder 5. Said master cylinder generates pressures in the braking circuits 6 of the vehicle.

According to the invention, an intermediate hydraulic or pneumatic device 3 is provided which will be denoted "simulator" 3 in the remainder of the description.

A braking control device or brake pedal 1 which is actuated by the driver of the vehicle makes it possible to control a hydraulic actuating device 7 which is maintained in the rear wall 46 of the brake servo. The actuating device 7 comprises a bore 71 in which an actuating piston 70 may slide.

The simulator 3 comprises a three-way valve (32, 34, 33) which permits:

either the communication of the working chamber 41 with the vacuum chamber 40. In this case, the pressures are substantially equalized on both sides of the piston 42 and said piston remains immobile, or the isolation of the working chamber 41 from the vacuum chamber 40 (in this case an initial braking phase)

or the communication of the working chamber 41 with atmospheric air, the working chamber being isolated from the vacuum chamber. A pressure difference is created between the vacuum chamber 40 and the working chamber 41. The brake servo piston is urged to be displaced toward the vacuum chamber (toward the left in FIG. 1). The displacement of the brake servo piston 42 has the result of pushing the push rod 43 toward the brake master cylinder 5. The brake servo thus provides a braking force to the brake master cylinder.

The system of the invention comprises, therefore, a three-way valve making it possible to control the brake booster 4 but this three-way valve is disconnected from the piston 42 of the brake servo and is not displaced therewith, in contrast to the three-way valves of the brake servos currently used in the prior art.

In such a system, the brake pedal is thus mechanically uncoupled from the brake booster 4, from the brake master cylinder 5 and the hydraulic braking circuits 6 of the vehicle.

The simulator 3 of FIG. 1 will now be described in more detail.

A piston 31 is mobile in a housing 39 and permits the three-way valve which is contained in a housing 38 to be controlled. This three-way valve comprises:

an axially mobile probe 32 under the control of the piston 31 and said probe is advantageously fixed to the piston 31, an axially mobile check valve 33 capable of bearing against the probe 32, a check valve seat 34 carried by an axially mobile bushing 340 and capable of bearing against the check valve 33.

In the resting position, the simulator is in the state shown in FIG. 1:

the probe 32 is pushed to the right (on FIG. 1) by the springs R21 and R22, the passage between the probe 32 (or more specifically the check valve seat carried by the probe) and the check valve 33 is closed, the bushing 340 is pushed to the right by the spring R3 without the passage between the check valve 33 and the check valve seat 34 being closed. More specifically, a stop limits the return of the bushing 340 to the right. The working chamber 41 is thus at the pressure of the vacuum chamber 40.

The probe 32 is controlled by the braking control member 1 by means of the actuating device 7 and by the piston 39.

When the driver presses on the brake pedal 1, the actuating piston 70 is displaced toward the left (on FIG. 1) into the bore 71. A pressurized fluid is transmitted through the valve 79 into the chamber 39. The piston 31 is pushed to the left and controls the displacement of the probe 32.

The displacement of the probe 32 to the left permits the check valve 33 to be displaced to the left under the action of the spring 24 and the passage between the check valve 33 and the check valve seat 34 is closed. The communication between the vacuum chamber 40 and the working chamber 41 is interrupted. Moreover, when displaced to the left, the probe 32 opens up a passage between the probe 32 and the check valve 33. The working chamber 41 is thus put in communication with atmospheric pressure via the access point 301, the passage 302, the passage between the probe 32 and the check valve 33, the access point 304 and the line 344.

A pressure difference is produced between the chambers 40 and 41 of the brake servo. The piston of the brake servo 42 is displaced to the left and controls, via the push rod 43, the operation of the brake master cylinder 5 which controls the pressurization of the braking circuit 6 of the vehicle.

During this operation, the passage between the check valve seat 34 and the check valve 33 is closed due to the spring R3 which pushes the bushing 340 to the right and the spring 24 which pushes the check valve 33 to the left.

Moreover, the simulator 3 has a chamber 35 which is connected via an access point 307 and a line 350 to the hydraulic braking circuit 6 of the vehicle. A shoulder 341 of the bushing 340 slides in the chamber 35. The pressure in the hydraulic braking circuit 6 is communicated to the chamber 35 and tends to push the shoulder 341 to the left. However, the spring R3 pushes the bushing 340 to the right.

When the pressure in the hydraulic braking circuit exceeds a specific threshold, and more specifically when the pressure exerted on the shoulder 341 becomes greater than the force exerted by the spring R3, the bushing 340 is displaced to the left. The check valve seat 34 is displaced to the left. The check valve 33 which is pushed to the left by the spring 24, accompanies the displacement of the check valve seat 34 until the check valve 33 comes into contact with the probe 32. The communication of the working chamber 41 with atmospheric pressure is then interrupted.

The system is thus in a state of braking equilibrium. The check valve seat 34 and the probe 32 bear against the check valve 33. If the face of the check valve 33 in contact with the probe and the check valve seat 34 is planar or approximately planar, the check valve seat 34 and the probe 32 may be considered to be aligned in the same plane.

In this state of braking equilibrium, the pressure in the working chamber 41 ceases to increase and maintains its pressurized state. The displacement of the piston 42 of the brake servo is braked, or even stopped. The pressure in the hydraulic braking circuit no longer increases.

During this operation, the displacement of the probe 32 has to overcome the force exerted to the right by the springs R21 and R22 on the shoulder 321 of the probe. Said springs thus simulate a braking force which is felt by the driver pressing on the brake pedal.

Advantageously, the two springs R21 and R22 have different degrees of stiffness. For example, the spring R21 has a stiffness which is less than that of the spring R22, which makes it possible to simulate different braking forces.

However, in a simplified variant not shown, one single spring could be provided instead of the springs R21 and R22.

In such a system, the travel/force and travel/pressure laws of the master cylinder are governed independently of one another and irrespective of the absorption of the braking system.

More specifically, the force on the brake pedal as a function of the travel of this pedal may be expressed by the formula:

$$Fin=(Tin \times R1)+(Tin \times S1/S2 \times R2)$$

Namely: $Fin=Tin(R1+S1 \cdot R2/S2)$
in which:
Fin=Input force on the brake pedal
Tin=Input travel on the brake pedal
S1=Hydraulic section of the actuating piston 70
R1=Stiffness of the return spring of the actuating piston 70
S2=Section of the piston of the simulator 3
S3=Annular section of the bushing 340
R3=Stiffness of the spring of the bushing
R2=R21+R22=Stiffness of the simulator springs.

A travel/force law may thus be obtained by selecting the characteristics of the different springs and the different effective cross sections at specific values.

For a given state of equilibrium of the valve (aligned seats), the force on the bushing is provided by:

$$F \text{ bushing}=R3 \times (Tin \times S1/S2)$$

The pressure in the master cylinder required to reach this force is:

$$Pmc=F \text{ bushing}/S3$$

The pressure in the master cylinder as a function of the travel of the brake pedal may thus be expressed by the formula:

$$Pmc=(R3/S3) \cdot (Tin \cdot S1/S2)$$

The state of equilibrium of the valve is reached when the check valve seat 34 and the seat of the probe 32 are aligned in the same plane.

The pressure in the braking circuit necessary to obtain this alignment is dependent on the stiffness of the spring R3. Thus the input travel/pressure law of the master cylinder is determined from these two last parameters, irrespective of the absorption of the braking circuit.

In the embodiment of FIG. 1, the brake pedal 1 acts on the piston 70 which is mobile in the housing 71. This housing contains a fluid, making it possible to transmit the pressure created by the piston 70. For example, this fluid is supplied by the brake fluid reservoir. Obviously, the pressure created by the piston 70 is retransmitted to the housing 39 when the valve 79 is open.

Moreover, in this embodiment, two springs R21 and R22 have been provided, which makes it possible to obtain two different slopes of the force on the brake pedal as a function of the travel. However, in a simplified embodiment a single spring may be provided.

Advantageously, the spring R3 is associated with a spring R38 which is preferably at rest in the free state (unbiased at rest) due to clearance created between said spring R38 and the internal face of the bushing 340.

In the event of malfunction of the brake servo 4 and/or of the simulator 3, the invention advantageously provides for the closure of the valve 79.

Thus as the valve 79 is closed for braking without pneumatic assistance, the housing 71 transmits the entire thrust onto the piston 70 without extending the travel.

Advantageously, a pneumatically controlled valve 79 is used, comprising a diaphragm of which one of the faces is connected pneumatically to the vacuum source 400 supplying the front chamber 40 of the pneumatic brake booster.

Advantageously, the valve 79 is an electric valve, the braking system further comprising a detector or sensor providing an electric signal in the absence of a vacuum in the front chamber 40 of the pneumatic brake booster.

Advantageously, the braking system further comprises a pressure sensor 79' connected to the housing 71 providing information, advantageously redundant, about the braking set value, resulting from the force exerted by the driver on the brake pedal.

During a braking command, the piston 70 is displaced to the left under the control of the brake pedal. The fluid in the housing 71 is compressed and causes the displacement to the left of the piston 73. Said piston presses with its base 74 onto the brake servo piston 42 which controls, via the push rod 43, the actuation of the pistons 50 and 51 of the master cylinder. Thus, in the event of an incident, the driver may act using the brake pedal on the pistons of the master cylinder.

Figure 2:
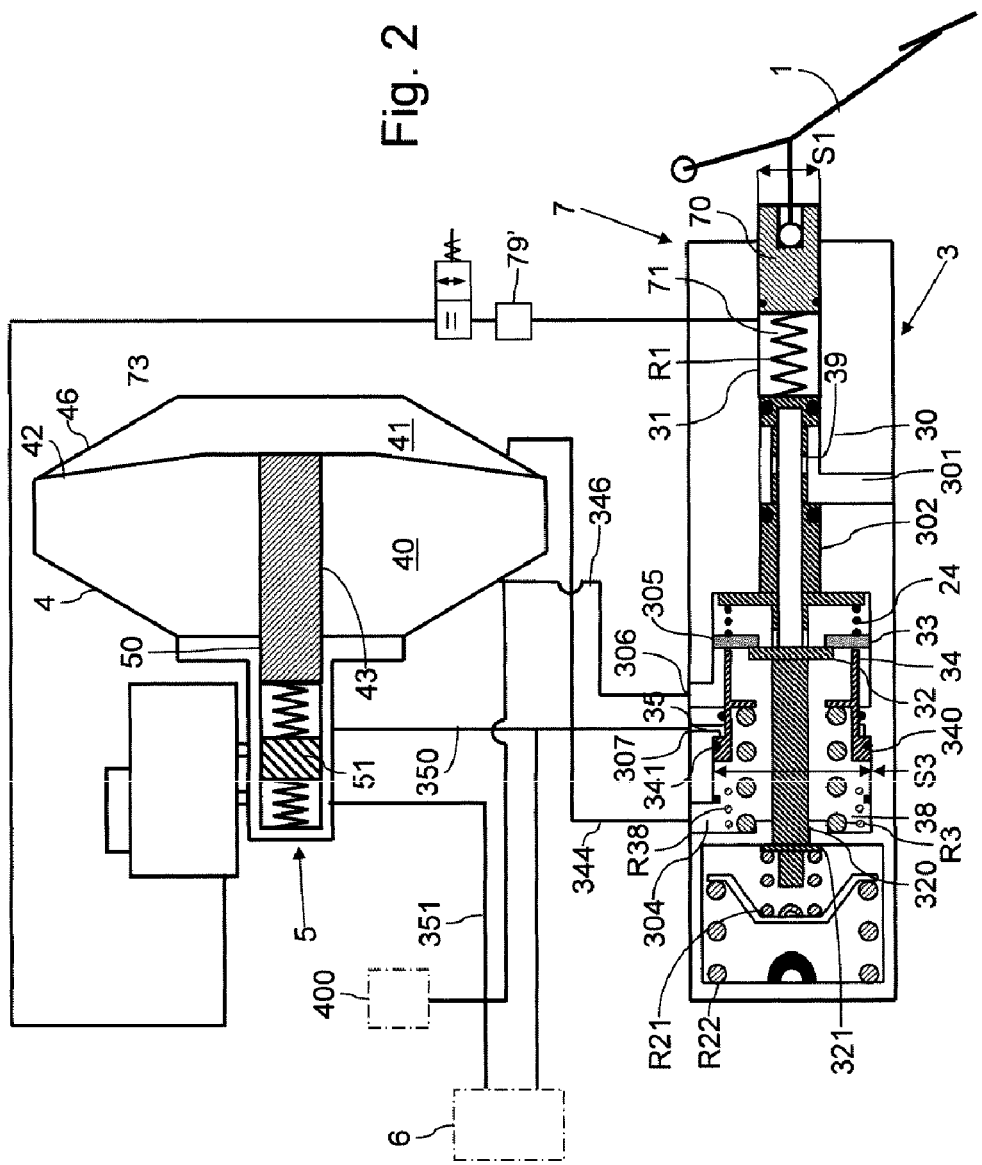
FIG. 2 shows a variant of the control system of FIG. 1.

FIG. 2 shows a variant of the invention in which the driver acts directly on the simulator 3 via the brake pedal.

The actuating piston 70 slides in the housing 71 which is integrated in the simulator 7. The fluid which is compressed in the housing 71 by the piston 70 controls the displacement of the piston 31 to the left. The operation of the simulator 3 and the control of the brake servo 4 are similar to that which has been described above.

Figure 3:
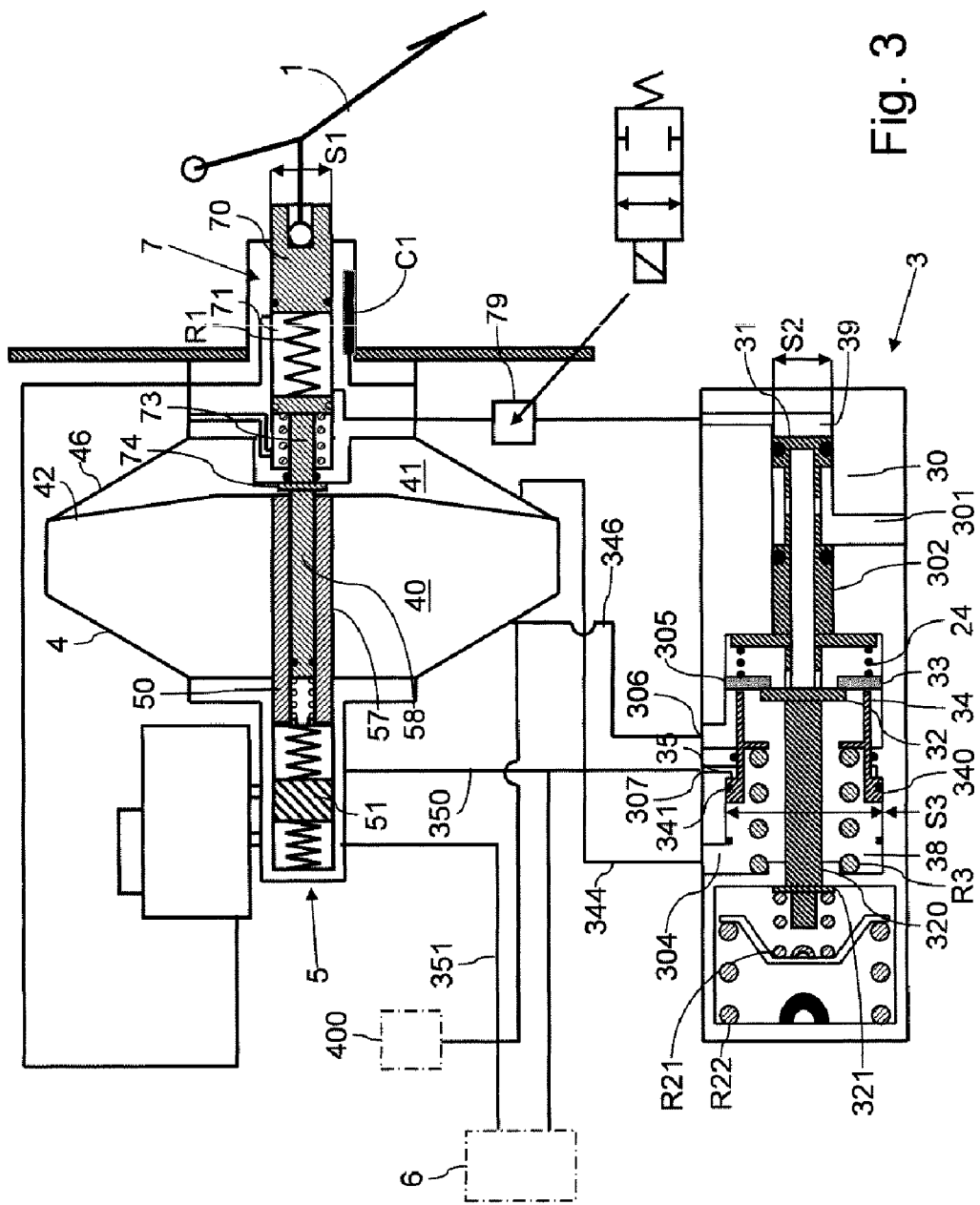
FIG. 3 shows a further variant of the control system according to the invention in which two concentric pistons are provided for the primary piston of the master cylinder.

FIG. 3 shows a further variant of the invention in which the primary piston of the master cylinder comprises two concentric pistons 57 and 58. The piston 57 is an annular piston and is controlled by the piston 42 of the brake servo. The central piston 58 slides in the annular piston 57 and is controlled by the brake pedal without the intervention of the brake servo piston 42.

With a simulator of the actuator type controlled by pressure (PCA or Pressure Control Actuation) the input control force provided by the driver does not contribute significantly to establishing the pressure in the braking system of the vehicle. This means that, relative to a conventional brake servo/master cylinder system with the same size of brake servo and the same diameter of master cylinder bore, the pressure at saturation is lower (approximately 10-15 bar, i.e. 1000-1500 kPa). A simple means of increasing the pressure at braking equilibrium is to reduce the cross section of the master cylinder by reducing the bore diameter. However, this reduces the total volume of fluid in the chamber which is necessary in certain situations, as in the case of the presence of air in the braking circuit. To remedy this, both the diameter of the bore of the master cylinder may be reduced and the travel of the brake pedal increased. However, the space taken up by the master cylinder/brake servo unit is increased.

According to the invention, therefore, a system comprising two concentric pistons is provided.

The operation of such a system will be described referring to FIGS. 4a to 4c and 5a, 5b.

When the driver presses on the brake pedal, a pressure is transmitted to the simulator 3 by the actuating device 7. The operation of the simulator 3 is as described above.

Figure 4A:
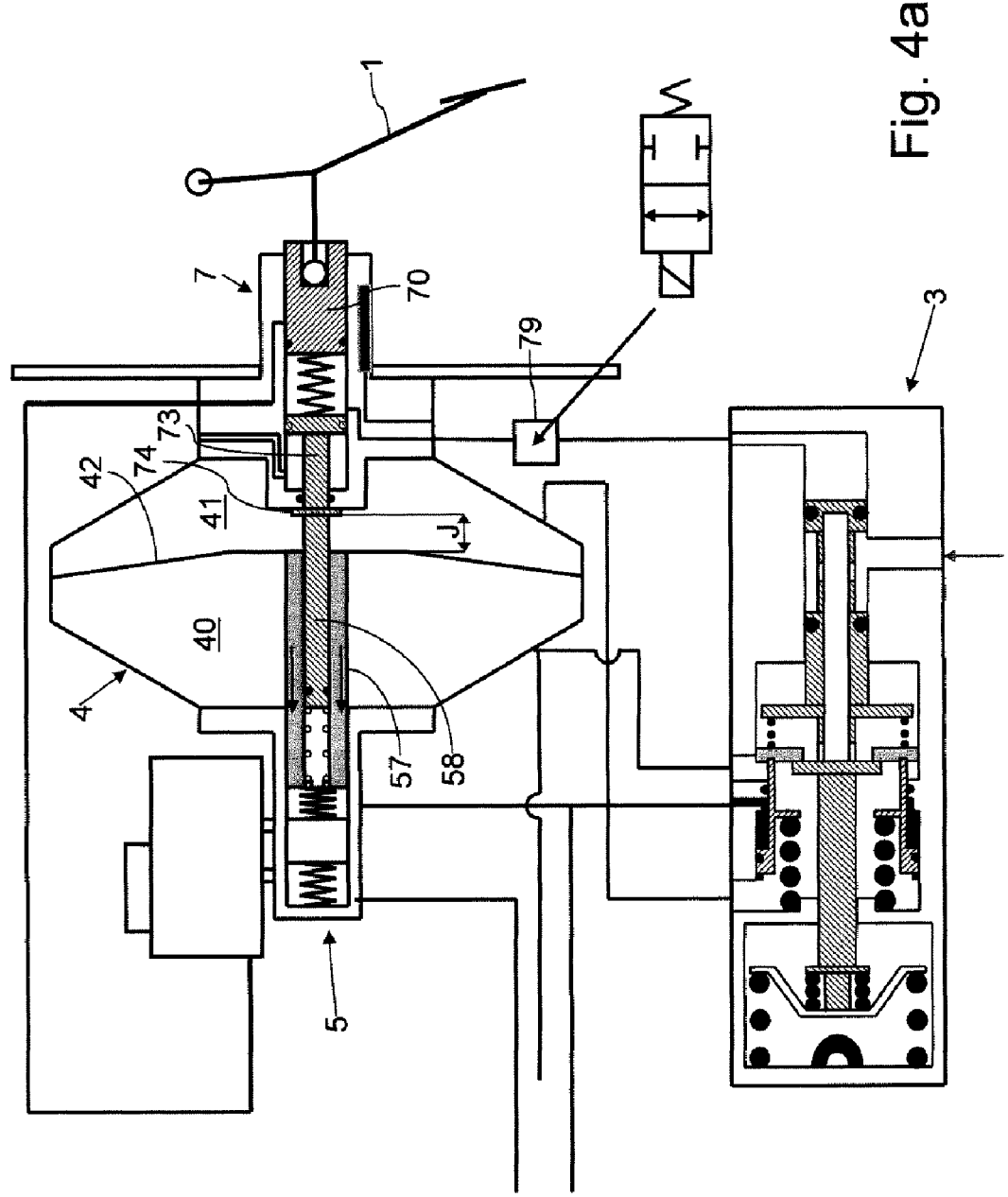
FIGS. 4a to 4c show different operating phases of the control system of FIG. 3 which prove the usefulness of the two concentric pistons of the master cylinder.

The piston 42 of the brake servo is thus controlled by the simulator 3 and displaced to the left. The piston 57 is displaced to the left as indicated in FIG. 4a.

Figure 5A:
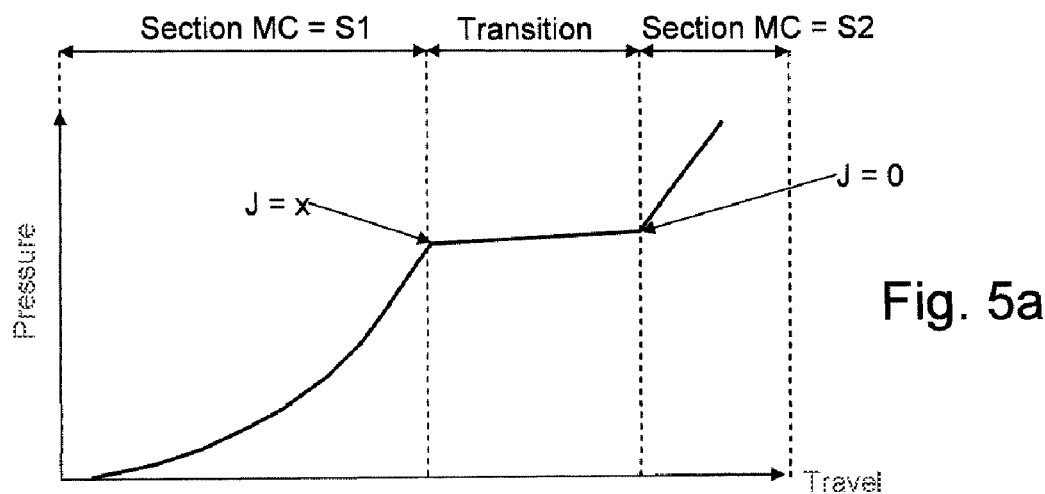
FIGS. 5a and 5b show operating curves of the control system of FIG. 3 respectively showing the pressure in the brake master cylinder, as a function of the travel of the brake pedal and the force exerted as a function of the travel of the brake pedal.
Figure 5B:
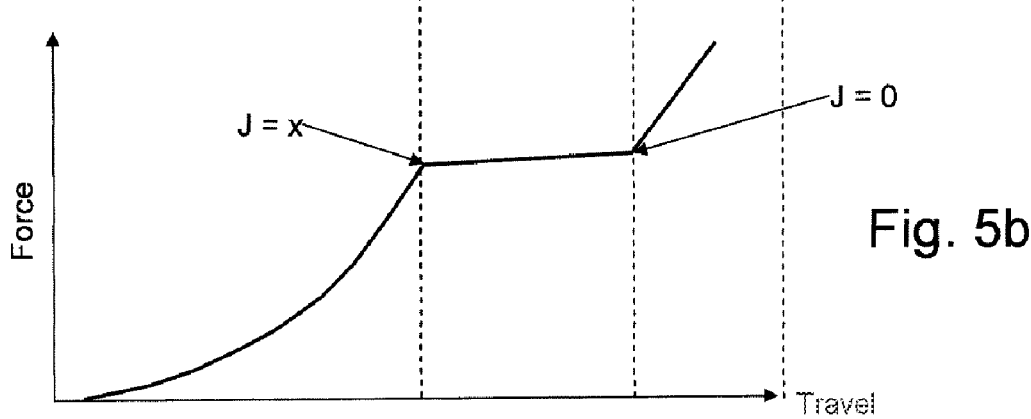

This operating phase corresponds, on FIGS. 5a and 5b, to the "section MC–S1" phase.

Only the annular piston 57 of the master cylinder is displaced. The pressure produced in the brake master cylinder corresponds, therefore, to the effective cross section of the annular piston 57. Thus a pressure and a displacement of fluid are produced according to the effective annular cross section of this piston. Whilst the annular piston is displaced to the left, an additional chamber is created in its internal diameter.

During the entire "section MC=S1" phase, the piston 58 receives the increasing pressure of the master cylinder over its cross section, which maintains the piston 58 in abutment by means of its shoulder 74 against the rear wall 46 of the brake servo in spite of the increasing pressure in the housing 71.

As disclosed above, at equilibrium and until saturation of the brake booster, the check valve seat 34 and the probe seat 32 are aligned in the same plane (more specifically when they bear against the check valve 33).

Figure 4B:
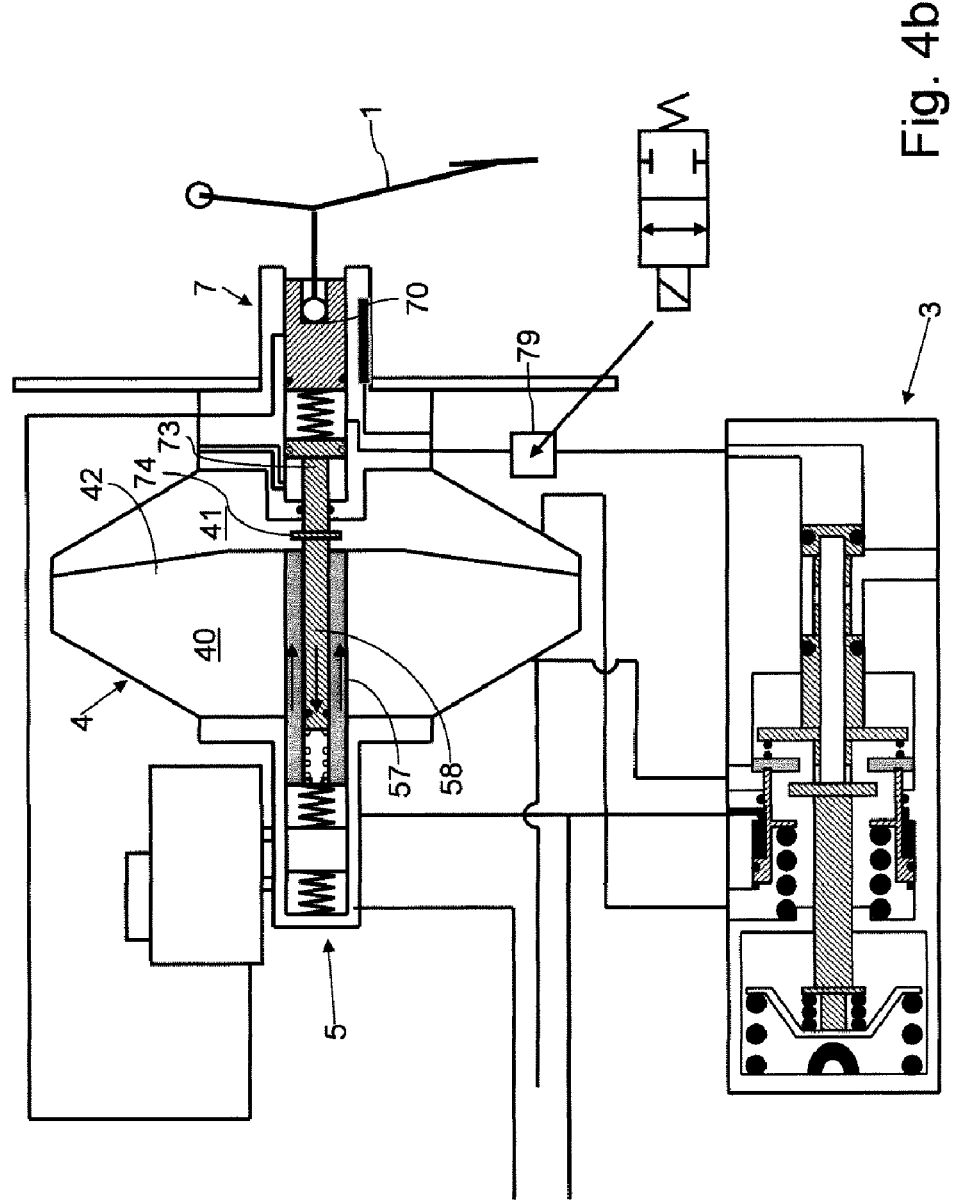

When saturation is reached, the shoulder 74 of the push rod 73 is located at a distance J=x from the piston 42 of the brake servo. The central piston 58 of the primary piston starts to be displaced to the left as the increase in input force is no longer balanced by an increase in pressure in the master cylinder. The fluid of the additional chamber is expelled into the primary chamber of the master cylinder. Since there is no additional force provided by the brake servo, a force to the right is applied to the annular piston 57 and onto the brake servo piston 42. Said pistons have the tendency to be displaced to the right. This phase is illustrated by FIG. 4b.

On the curves of FIGS. 5a and 5b, the operation of the system is in the zone denoted as the "transition" zone.

When the shoulder 74 then arrives in abutment with the brake servo piston 42 (J=0 in FIG. 5a). The quantity of volume of brake fluid in the primary chamber of the master cylinder is thus equivalent to that which it would have been if the two pistons 57 and 58 had advanced together to the left from the start of the braking process.

When the driver continues to press on the brake pedal, the force is now exerted via the shoulder 74 on the two pistons 57 and 58.

Figure 4C:
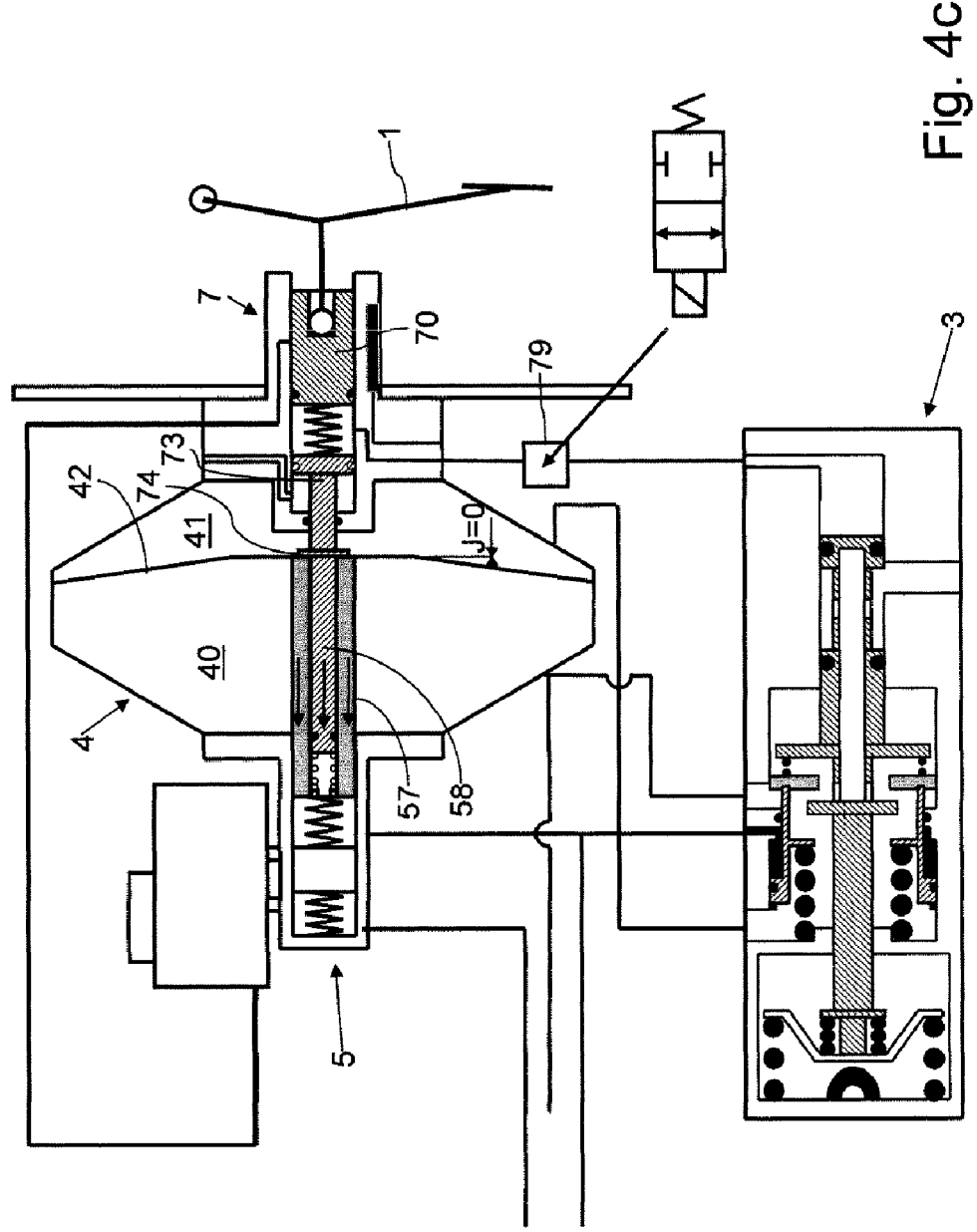

This operating phase is illustrated by FIG. 4c.

Any subsequent increase in the input force on the brake pedal is exerted on the two pistons 57 and 58. The brake fluid in the brake chamber is compressed along the total section S2 of the two pistons 57 and 58.

On the curves of FIGS. 5a and 5b, the operation of the system is in the zone indicated as "section MC=S2".

It emerges from the above description that the system of the invention makes it possible in a normal braking situation to obtain efficient braking with reduced force on the part of the driver. However, the driver may increase the braking force, in particular in the case of extreme braking, by exerting an additional force on the brake pedal.

During the transition phase indicated in FIGS. 5a and 5b, the size of the space between the shoulder 74 and the piston 42 of the brake servo is reduced until the shoulder 74 is in contact with the piston 42. During this phase, there is a small increase in pressure in the brake master cylinder for a given input travel.

According to a variant of the invention, the use of an additional pressure source (hydraulic unit) is provided during this transition zone.

For this, the invention advantageously provides to detect the braking saturation phase mentioned above by measuring, on the one hand, the variations in the travel of the brake pedal and, on the other hand, the variations in pressure produced in the brake master cylinder. The detection of a small variation in pressure for a variation in travel which is greater than a specific value makes it possible to detect a braking saturation situation and thus to detect the transition zone of FIGS. 5a and 5b.

According to the invention, therefore, the production of an additional pressure in the braking circuit of the vehicle is controlled using an additional pressure source such as a hydraulic unit.

Figure 6A:
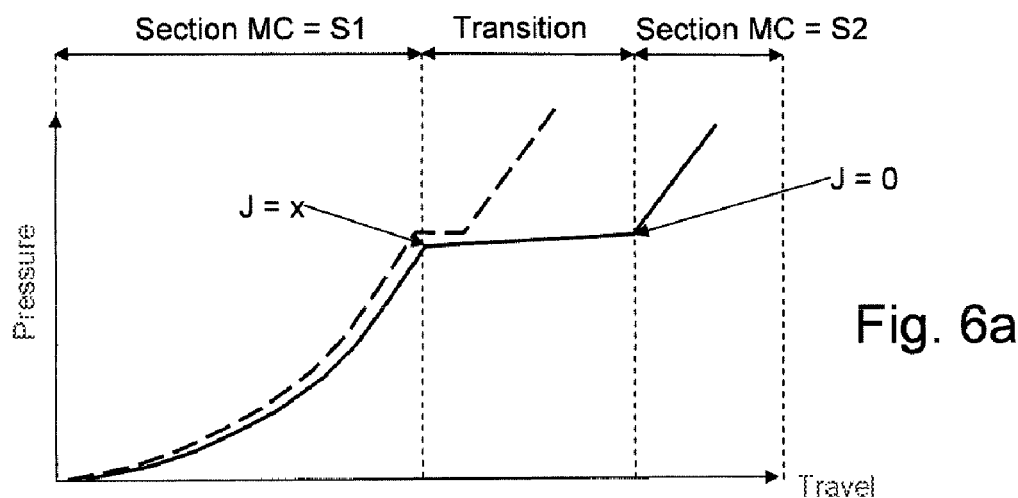
FIGS. 6a and 6b show operating curves of a control system such as that of FIG. 3 in which an additional pressure source is provided making it possible to generate increased pressure in the braking circuit.
Figure 6B:
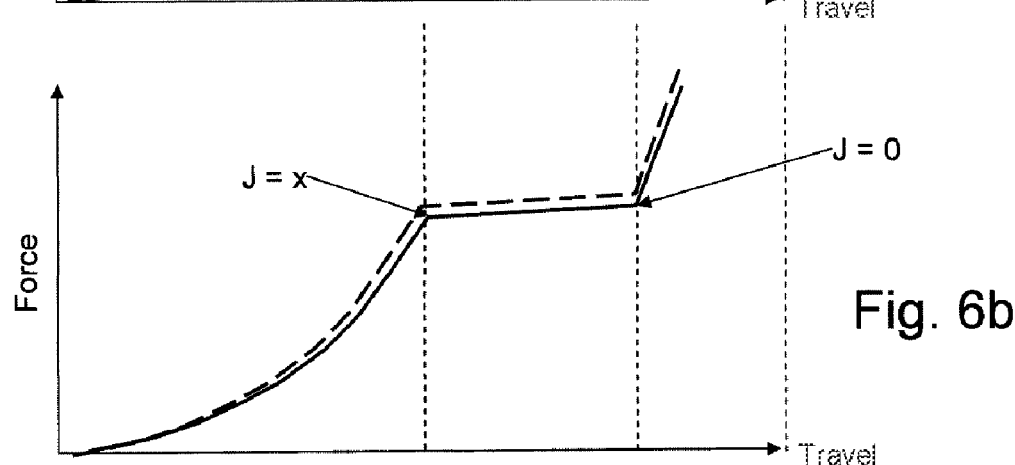

This operation is illustrated by FIGS. 6a and 6b. The operation of the system without the intervention of an additional pressure source has been illustrated in solid lines. The curves in solid lines thus correspond to the operation of FIGS. 5a and 5b.

The operation of the system with the intervention of an additional pressure source is shown in dotted lines. At the start of the transition zone, when the shoulder 74 is at a distance x from the piston 42 (J=x), the transition zone is detected. The additional pressure source causes an overpressure in the master cylinder which makes it possible to reduce the transition zone.

The system of the invention has the advantages:

of being able to control the travel/force and travel/pressure laws in the master cylinder independently of one another as has been disclosed above.

of filtering interference originating from the hydraulic circuit (for example, vibratory hydraulic pulsations which are produced when regulating the ABS system), of being insensitive to large displacements of brake fluid, for example, in brakes of large size (brakes of large diameter and/or having large travel) and to variations in absorption, of being insensitive to transfers of volumes of brake fluid, caused by a hydraulic unit, in one direction or another, between the brakes of the vehicle and the master cylinder.

of controlling, in normal braking, the operation of the brake servo without there being mechanical contact between the control rod actuated by the brake pedal and the push rod 43. The control is purely pneumatic.

of being able to implement dual slope operation.

of obtaining a braking system without electric control which thus has a high degree of robustness.

The invention may be applied to vehicles equipped:

with internal combustion engines, with electric motors provided with electric braking systems having energy recovery, both with internal combustion engines and electric motors (hybrid vehicles).

It may be applied equally well to light vehicles as to heavy vehicles. The diameter of the piston of the simulator will be defined according to the mass of the vehicle to be braked. It will be defined as sufficiently small to be able to respond to the requirements of emergency braking.

It is obvious that the supply of brakes with pressurized brake fluid via the brake master cylinder and the brake servo may be complemented by any additional supply such as a hydraulic unit to improve the braking performance or to mitigate against a malfunction.

The invention claimed is:

1. Braking control system for automotive vehicles comprising a braking control member (1), a brake booster (4) which comprises a vacuum chamber (40) and a working chamber (41) separated by a servomotor piston (42), said brake booster (4) being operable to provide increased braking control according to the difference in pressure existing between said two chambers, a brake master cylinder (5) receiving increased braking commands from the brake booster (4) and producing a braking pressure in the hydraulic braking circuit (6) of the vehicle, the system further comprising a simulator (3) coupled one of pneumatically and hydraulically to the piston (42) of the brake booster (4), said simulator (3) receiving at least one braking command from the braking control member (1) and being operable to one of establish and monitor, in return, a difference in pressure between the vacuum chamber (40) and the working chamber (41) of the brake booster so as to control the displacement of the piston (42) characterized in that said simulator (3) comprises a hydraulically controlled pneumatic three-way valve operable to:

the event of a braking command initiated by the braking control member (1), to put the working chamber (41) in communication with a greater pressure than that of the vacuum chamber (40) to control operation of the brake booster and, as a result, actuation of the master cylinder (5), and when the pressure in the hydraulic braking circuit (6) of the vehicle exceeds a pressure threshold, to stop the communication of the working chamber (41) with said pressure which is greater than that of the vacuum chamber, characterized in that a control piston (31) is hydraulically controlled by the braking control member (1) and operable to control displacement of a probe (32), characterized in that the three-way valve comprises:

an axially mobile probe (32), an axially mobile check valve (33), capable of bearing against said mobile probe (32), an axially mobile check valve seat (34), capable of bearing against the check valve (33), the mobile probe (32) being controlled by the braking control member (1) so as to move away from the check valve (33) and thus put the working chamber (41) in communication with atmospheric pressure, and said check valve seat (34) being controlled by the pressure prevailing in the hydraulic braking circuit (6) to move away from said check valve (33) and permit said check valve to move toward the mobile probe (32) and to interrupt the communication of the working chamber (41) with atmospheric pressure when the pressure in the braking circuit exceeds said pressure threshold.

2. Braking control system according to claim 1 characterized in that said check valve seat (34) one of is carried by an axially mobile bushing (340) and forms part of said bushing, a first spring (R3) being operable to exert a first force on said bushing to push said bushing toward the check valve (33), said bushing being mobile in a first pressure admission chamber (35) which is hydraulically coupled to the hydraulic braking circuit (6) of the vehicle and which is brought to the pressure which prevails in the hydraulic braking circuit, so that said pressure exerts on the bushing (340) a second force counter to the first force exerted by the first spring.

3. Braking control system according to claim 2, characterized in that at least one second spring (R21) provides a third force tending to oppose the axial displacement of said probe (32) under the control of the braking control member.

4. Braking control system according to claim 3, characterized in that a third spring (R22) having an elasticity which is different from that of the second spring (R21) provides a fourth force which tends, in combination with the force of the second spring, to oppose the axial displacement of said probe (32) under the control of the braking control member.

5. Braking control system according to claim 4, characterized in that the axially mobile probe (32) comprises a control shaft (320) having a bearing element (321) on which said second and third springs (R21, R22) exert their forces which tend to oppose the axial displacement of said probe (32).

6. Braking control system according to claim 5, characterized in that a control piston (31) is hydraulically controlled by the braking control member (1) and operable to control the displacement of said probe (32).

7. Braking control system according to claim 6, characterized in that an actuating device (7) comprises an actuating chamber (71) in which an actuating piston (70), controlled by the control member (1), slides, said control piston (31) being coupled hydraulically to said actuating chamber (71) by a stop valve (79) so that:

in a first operating mode, said stop valve permits the actuating piston (70) to control the displacement of the control piston (31), and, in a second operating mode, said stop valve prevents the actuating piston (70) from controlling displacement of the control piston (31), the actuating piston (70) thus hydraulically controlling displacement of a control rod (73) which acts on a primary piston (50) of the master cylinder (5).

8. Braking control system according to claim 7, characterized in that said control rod (73) acts on the servomotor piston (42), which acts on the primary piston of the master cylinder.

9. Braking control system according to claim 8, characterized in that the brake master cylinder comprises a primary piston which comprises an annular piston (57) which is controlled by the brake servo piston (42) and a central piston (58) which slides in the annular piston (57) and which is controlled by the control member (1) without the intervention of the brake servo piston (42).

10. Braking control system according to claim 9, characterized in that a control rod (73) is actuated hydraulically by the actuating piston (70) and operable to act on the servomotor piston (42).

11. Braking control system according to claim 10, characterized in that the control rod (73) is mechanically coupled to the central piston (58) and comprises a shoulder (74) not intended to be in contact with the servomotor piston (42) of a pneumatically assisted braking system when the three-way valve of the simulator is in a state of braking equilibrium and intended to press against the servomotor piston (42) one of during non-assisted braking and beyond braking saturation of the pneumatic brake booster during assisted braking.

12. Braking control system according to claim 1, characterized in that a control piston (31) is hydraulically controlled by the braking control member (1) and which operable to control displacement of a probe (32).

13. Braking control system according to claim 12, characterized in that an actuating device (7) comprises an actuating chamber (71) in which an actuating piston (70), controlled by the control member (1), slides, said control piston (31) being coupled hydraulically to said actuating chamber (71) by a stop valve (79) so that:

in a first operating mode, said stop valve permits the actuating piston (70) to control the displacement of the control piston (31), and, in a second operating mode, said stop valve prevents the actuating piston (70) from controlling the displacement of the control piston (31), the actuating piston (70) thus hydraulically controlling displacement of a control rod (73) which acts on a primary piston (50) of the master cylinder (5).

14. Braking control system according to claim 1, characterized in that the brake master cylinder comprises a primary piston which comprises an annular piston (57) which is controlled by the brake servo piston (42) and a central piston (58) which slides in the annular piston (57) and which is controlled by the control member (1) without the intervention of the brake servo piston (42).

15. Braking control system for automotive vehicles comprising a braking control member (1), a brake booster (4) which comprises a vacuum chamber (40) and a working chamber (41) separated by a servomotor piston (42), said brake booster (4) being operable to provide increased braking control according to the difference in pressure existing between said two chambers, a brake master cylinder (5) receiving increased braking commands from the brake booster (4) and producing a braking pressure in the hydraulic braking circuit (6) of the vehicle, the system further comprising a simulator (3) coupled one of pneumatically and hydraulically to the piston (42) of the brake booster (4), said simulator (3) receiving at least one braking command from the braking control member (1) and being operable to one of establish and monitor, in return, a difference in pressure between the vacuum chamber (40) and the working chamber (41) of the brake booster so as to control the displacement of the piston (42) characterized in that said simulator (3) comprises a hydraulically controlled pneumatic three-way valve operable to:

- the event of a braking command initiated by the braking control member (1), to put the working chamber (41) in communication with a greater pressure than that of the vacuum chamber (40) to control operation of the brake booster and, as a result, actuation of the master cylinder (5), and
- when the pressure in the hydraulic braking circuit (6) of the vehicle exceeds a pressure threshold, to stop the communication of the working chamber (41) with said pressure which is greater than that of the vacuum chamber, characterized in that a control piston (31) is hydraulically controlled by the braking control member (1) and operable to control displacement of a probe (32), characterized in that an actuating device (7) comprises an actuating chamber (71) in which an actuating piston (70), controlled by the control member (1), slides, said control piston (31) being coupled hydraulically to said actuating chamber (71) by a stop valve (79) so that:
    - in a first operating mode, said stop valve permits the actuating piston (70) to control the displacement of the control piston (31),
    - and in a second operating mode, said stop valve prevents the actuating piston (70) from controlling the displacement of the control piston (31), the actuating piston (70) thus hydraulically controlling displacement of a control rod (73) which acts on a primary piston (50) of the master cylinder (5).

16. Braking control system according to claim 15, characterized in that said control rod (73) acts on the servomotor piston (42), which acts on the primary piston of the master cylinder.

17. Braking control system according to claim 16, characterized in that the brake master cylinder comprises a primary piston which comprises an annular piston (57) which is controlled by the brake servo piston (42) and a central piston (58) which slides in the annular piston (57) and which is controlled by the control member (1) without the intervention of the brake servo piston (42).

18. Braking control system for automotive vehicles comprising a braking control member (1), a brake booster (4) which comprises a vacuum chamber (40) and a working chamber (41) separated by a servomotor piston (42), said brake booster (4) being operable to provide increased braking control according to the difference in pressure existing between said two chambers, a brake master cylinder (5) receiving increased braking commands from the brake booster (4) and producing a braking pressure in the hydraulic braking circuit (6) of the vehicle, the system further comprising a simulator (3) coupled one of pneumatically and hydraulically to the piston (42) of the brake booster (4), said simulator (3) receiving at least one braking command from the braking control member (1) and being operable to one of establish and monitor, in return, a difference in pressure between the vacuum chamber (40) and the working chamber (41) of the brake booster so as to control the displacement of the piston (42) characterized in that said simulator (3) comprises a hydraulically controlled pneumatic three-way valve operable to:

- the event of a braking command initiated by the braking control member (1), to put the working chamber (41) in communication with a greater pressure than that of the vacuum chamber (40) to control operation of the brake booster and, as a result, actuation of the master cylinder (5), and
- when the pressure in the hydraulic braking circuit (6) of the vehicle exceeds a pressure threshold, to stop the communication of the working chamber (41) with said pressure which is greater than that of the vacuum chamber, characterized in that a control piston (31) is hydraulically controlled by the braking control member (1) and operable to control displacement of a probe (32), characterized in that the brake master cylinder comprises a primary piston which comprises an annular piston (57) which is controlled by the brake servo piston (42) and a central piston (58) which slides in the annular piston (57) and which is controlled by the control member (1) without the intervention of the brake servo piston (42).

19. Braking control system according to claim 18, characterized in that a control rod (73) is actuated hydraulically by the actuating piston (70) and operable to act on the servomotor piston (42).

20. Braking control system according to claim 19, characterized in that the control rod (73) is mechanically coupled to the central piston (58) and comprises a shoulder (74) not intended to be in contact with the servomotor piston (42) of a pneumatically assisted braking system when the three-way valve of the simulator is in a state of braking equilibrium and intended to press against the servomotor piston (42) one of during non-assisted braking and beyond braking saturation of the pneumatic brake booster during assisted braking.

\* \* \* \* \*